US005764297A

United States Patent [19]

Sengoku

[11] Patent Number: 5,764,297
[45] Date of Patent: Jun. 9, 1998

[54] SYSTEM FOR CONVERTING ASPECT RATIO OF VIDEO SIGNAL HAVING FREQUENCY MODULATED READ CLOCK SIGNALS

[75] Inventor: Yoshinari Sengoku, Saitama, Japan

[73] Assignee: Sony Corporation, Tokyo, Japan

[21] Appl. No.: 934,309

[22] Filed: Sep. 19, 1997

Related U.S. Application Data

[63] Continuation of Ser. No. 713,093, Sep. 16, 1996, abandoned, which is a continuation of Ser. No. 397,646, Mar. 2, 1995, abandoned.

[30] Foreign Application Priority Data

Mar. 8, 1994 [JP] Japan .................................. 6-036646

[51] Int. Cl.$^6$ .......................... H04N 7/01; H04N 3/223; H04N 5/46
[52] U.S. Cl. .......................... 348/445; 348/556; 348/704
[58] Field of Search .................................. 348/445, 512, 348/520, 536, 537, 539, 540, 553, 555, 556, 704

[56] References Cited

U.S. PATENT DOCUMENTS

| 4,556,906 | 12/1985 | Dischert et al. | 348/556 |
| 4,605,952 | 8/1986 | Powers | 348/445 |
| 4,622,577 | 11/1986 | Reitmeier et al. | 348/556 |
| 4,729,012 | 3/1988 | Jose et al. | 348/556 |
| 5,134,479 | 7/1992 | Ohishi | 348/556 |
| 5,223,936 | 6/1993 | Van Der Voort et al. | 348/445 |
| 5,231,490 | 7/1993 | Park | 348/704 |
| 5,301,025 | 4/1994 | Hatano et al. | 348/704 |
| 5,323,235 | 6/1994 | Tonomura et al. | 348/445 |
| 5,345,272 | 9/1994 | Ersoz et al. | 348/445 |
| 5,436,669 | 7/1995 | Baba et al. | 348/704 |

Primary Examiner—Mark R. Powell
Assistant Examiner—John W. Miller
Attorney, Agent, or Firm—Jay H. Maioli

[57] ABSTRACT

A signal processing circuit achieves a wide display mode without switching on and off an S correction in a horizontal deflecting system, and includes digital memories 16a, 16b and 16c for receiving a luminance signal Y, a color difference signal B-Y and a color difference signal R-Y. The writing operation of each digital memory is controlled by a sampling clock $f_{CW}$ of a write control circuit 18, and the reading operation of each digital memory is controlled by a sampling clock $f_{CR}$ of a read control circuit 19. A clock oscillator 24 of the read control circuit 19 produces the sampling clock $f_{CR}$ whose frequency is varied in accordance with a modulation voltage of a modulation voltage generator 31 in each line interval.

9 Claims, 8 Drawing Sheets

FULL MODE

NORMAL MODE

ZOOM MODE

WIDE MODE

SYSTEM FOR CONVERTING ASPECT RATIO OF VIDEO SIGNAL HAVING FREQUENCY MODULATED READ CLOCK SIGNALS

This is a continuation of application Ser. No. 08/713,093 filed Sep. 16, 1996, now abandoned, which is a continuation of application Ser. No. 08/397,646 filed Mar. 2, 1995, now abandoned.

BACKGROUND OF THE INVENTION

1. Field of the Invention

The present invention relates to a system for presenting visual images or a nonlinear picture processing circuit. In particular, the present invention relates to a television or video system for presenting a source picture signal of a 4:3 aspect ratio, for example, on a screen of a 16:9 aspect ratio, for example, or a picture signal processing circuit for performing an S shape correction.

2. Description of the Related Art

The aspect ratio is 4:3 in the NTSC system whereas a high quality television system (Highvision) employs a wide aspect ratio of 16:9. In an effort to increase the compatibility between the two systems, a receiver having a wide screen of a 16:9 aspect ratio is arranged to have four different display modes shown in FIGS. 7A–7D to present both a 4:3 source image of the NTSC, and a 16:9 image of the high quality (or high definition) television broadcast.

In a full mode shown in FIG. 7A, a 4:3 source picture is expanded sideways to obtain a 16:9 picture. FIG. 7B shows a normal mode in which the 4:3 source picture is displayed in a 4:3 central area with left and right blanks. In a zoom mode shown in FIG. 7C, the 4:3 source picture is expanded vertically, and upper and lower portions are cut off to present a picture of correct circularity (roundness). In a wide mode shown in FIG. 7D, the circularity in a central region is held accurate while both sides in the picture are expanded to obtain a 16:9 picture.

To achieve the wide mode, one conventional example employs a means for cutting an S shape correction in a horizontal deflection circuit. When an electron beam is swung by a pure sawtooth signal of a horizontal synchronizing period, an angular speed dθ/dt is held constant, and therefore, the scanning speed is slower in the central region and faster in the left and right side regions as shown in FIG. 8. As a result, the picture presented on the screen is expanded in both side regions and compressed in the central region, as shown in FIG. 9. Therefore, as shown in FIG. 10, a horizontal deflection circuit is provided with an S shape correcting capacitor C connected in series with a horizontal deflecting coil L. By adding an S shape correcting component to the above-mentioned sawtooth signal with this capacitor, this circuit performs an S shape correction to correct the expansion in each side region and the compression in the central region. With the S correction, the horizontal circuit can improve the linearity in the horizontal direction. There is further provided a switching means for opening/short-circuiting the S correcting capacitor C. The conventional system is arranged to achieve the wide mode shown in FIG. 7D by allowing the side regions to be expanded and the central region to be compressed with this switching means being held in a state to cut off the S correction.

However, the operation of switching the S correction on and off causes variations in the scanning intervals of red, green and blue, resulting in a shift in convergence. Specifically, in a projection television receiver having three, red, green and blue CRTs projecting images on a screen, this undesired tendency is increased by switching on and off the S correction in the respective CRTs. In practice, two different settings of registration (which means the convergence in a projection TV) are required for the on and off states of the S correction. This complicates the circuit, and increases the manufacturing cost.

Moreover, by the influence of a resistance included in the horizontal deflecting coil L, the expansions of the left and right side regions, and the compression of the central region tend to be asymmetrical bilaterally, resulting in asymmetric linearity. Therefore, a complicated and costly circuit for correction is required to turn on and off the S correction without losing the balance between the left and right.

As the switching means for opening/short-circuiting the S correction capacitor C, a switching transistor of a high withstanding voltage is required. This requirement further increases the cost.

There is a demand for measures for obtaining the same effect as the conventional system of switching on and off the S correction, without using the S correcting means in the horizontal deflection circuit or a registration adjusting circuit.

SUMMARY OF THE INVENTION

It is therefore an object of the present invention to provide a picture system, such as television or video equipment or nonlinear picture processing circuit, which can achieve a wide mode without switching on and off the S correction or without changing a setting of a registration adjusting circuit, or which can maintain the satisfactory bilaterally-symmetrical characteristic without complicating the horizontal deflection circuit and the registration adjusting circuit. It is another object of the present invention to provide a nonlinear picture processing circuit which can provide the same characteristic as the conventional system for switching on and off the S correction, without employing the S correcting means in the horizontal deflecting circuit or the registration adjusting circuit.

According to the present invention, a picture signal display system comprises an aspect converting circuit for receiving a picture signal of a first aspect ratio and a picture signal of a second aspect ratio; a digital memory for receiving an output signal from said aspect converting circuit; a synchronizing separator circuit for separating a synchronizing signal from said picture signals; a clock oscillator capable of modulating a frequency of a sampling clock of the writing and/or reading operation of said memory at intervals of horizontal scanning; and a display for displaying said picture signal. A picture signal processing circuit according to the invention comprises an aspect converting circuit for receiving a picture signal of a first aspect ratio and a picture signal of a second aspect ratio; a digital memory for receiving an output signal from said aspect converting circuit; a synchronizing separator circuit for separating a synchronizing signal from said picture signals; and a clock oscillator capable of modulating a frequency of a sampling clock of the writing and/or reading operation of said memory at intervals of horizontal scanning.

The thus-constructed system or circuit according to the present invention can process the picture signal substantially in the same manner as a reversed S correction. Therefore, this system can achieve a wide mode without the need for the means for turning on and off the S correction and without changing the setting of the registration adjusting circuit.

Moreover, the system can provide a satisfactory symmetrical characteristic without increasing the cost and complexity of the horizontal deflection circuit and the registration adjusting circuit.

The system is provided with a memory for storing the picture signal, and a circuit capable of modulating the frequency of the sampling clock of the writing and/or reading operation of this memory, periodically, at intervals of horizontal scanning. Therefore, this system can eliminate the necessity for providing the S correcting means and the switching means for the S correction in the horizontal deflecting circuit.

DETAILED DESCRIPTION OF THE PREFERRED EMBODIMENT

FIGS. 1A–6 show a picture system according to one embodiment of the present invention. The picture system of this example is a television receiver having a screen aspect ratio of 16:9.

Figure 2:
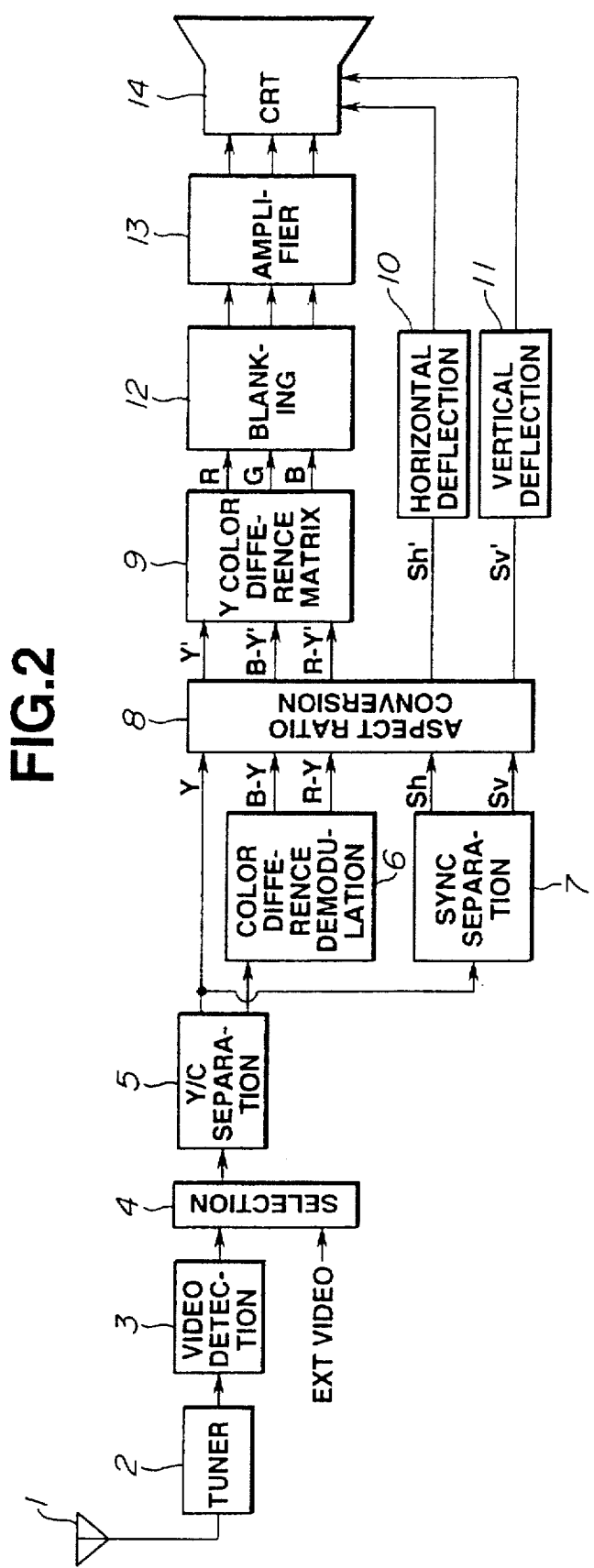
FIG. 2 is a schematic block diagram showing a television receiver according to one embodiment of the present invention.

FIG. 2 shows a color television receiver configuration of this example. An antenna 1 receives broadcast waves, and supplies the broadcast waves to a tuner 2. The tuner 2 converts the broadcast waves to a video intermediate frequency signal, and delivers the video intermediate frequency signal to a video detector circuit 3, which demodulates the video intermediate frequency signal and produces a composite video signal. This video signal is sent to a selector circuit (or switching circuit) 4. The selector circuit 4 selects one of the video signals from the antenna 1, and a video signal from an external device such as a VCR, and delivers the selected signal to a Y/C separator circuit 5.

The Y/C separator circuit 5 divides the composite video signal into a luminance signal Y, and a chrominance signal C, and sends the chrominance signal C to a color difference demodulating circuit 6, and the luminance signal Y to each of a synchronizing separator circuit 7 and an aspect ratio converting circuit 8. The color difference demodulating circuit 6 demodulates the chrominance signal to a color difference signal B-Y and a color difference signal R-Y, and sends these color difference signals to the aspect ratio converting circuit 8. The sync separator circuit 7 separates a horizontal synchronizing signal Sh and a vertical synchronizing signal Sv from the luminance signal Y, and sends these synchronizing signals to the aspect ratio converting circuit 8.

The aspect ratio converting circuit 8 is a horizontal nonlinear processing circuit, and is designed to change the picture aspect ratio in conformity with the aspect ratio determined by the screen size of a CRT 14. In this example, the CRT 14 has a wide screen of a16:9 aspect ratio. The aspect ratio converting circuit 8 delivers the aspect-ratio-converted luminance signal Y' and color difference signals B-Y' and R-Y' to a Y color difference matrix circuit 9, and at the same time delivers horizontal and vertical synchronizing signals Sh' and Sv' corresponding to these picture signal components, respectively, to horizontal and vertical deflecting (or drive) circuits 10 and 11.

The Y color difference matrix circuit 9 transforms the converted luminance signal Y', the converted color difference signal B-Y' and the converted color difference signal R-Y' to three primary color signals R, G and B, and supplies these primary signals R, G and B to a blanking circuit 12. The blanking circuit 12 performs a blanking operation on the primary color signals R, G and B in accordance with horizontal and vertical blanking pulses (H and V). In this way, the deflecting circuits 10 and 11 control deflection of one or more electron beams After the blanking operation, the three primary color signals R, G and B are amplified by an amplifier 13, and then supplied to the CRT 14.

The horizontal deflecting circuit 10 drives a horizontal deflecting yoke of the CRT 14 in accordance with the horizontal sync signal Sh' while the vertical deflecting circuit 11 drives a vertical deflecting yoke in accordance with the vertical sync signal Sv'.

Figure 10:
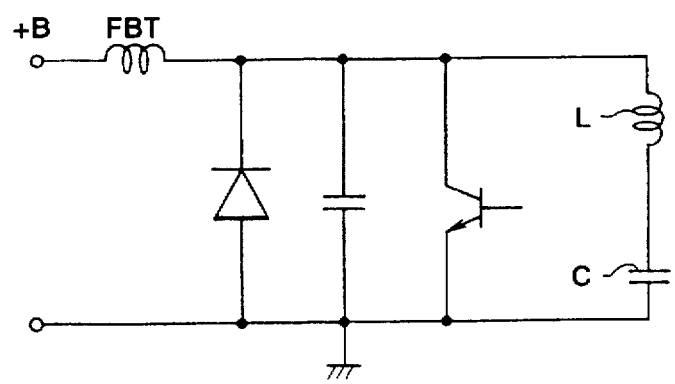
FIG. 10 is a diagram showing a conventional horizontal deflection circuit.

The horizontal deflecting circuit 10 of this example includes an S shape correcting capacitor (or condenser) C, as shown in FIG. 10, for serving as a means for S shape correction. Unlike the conventional example, however, the horizontal deflecting circuit 10 of this example has no switching means for switching the S correcting capacitor on and off. Therefore, the S correction is always carried out in this horizontal deflecting system.

Figure 1A:
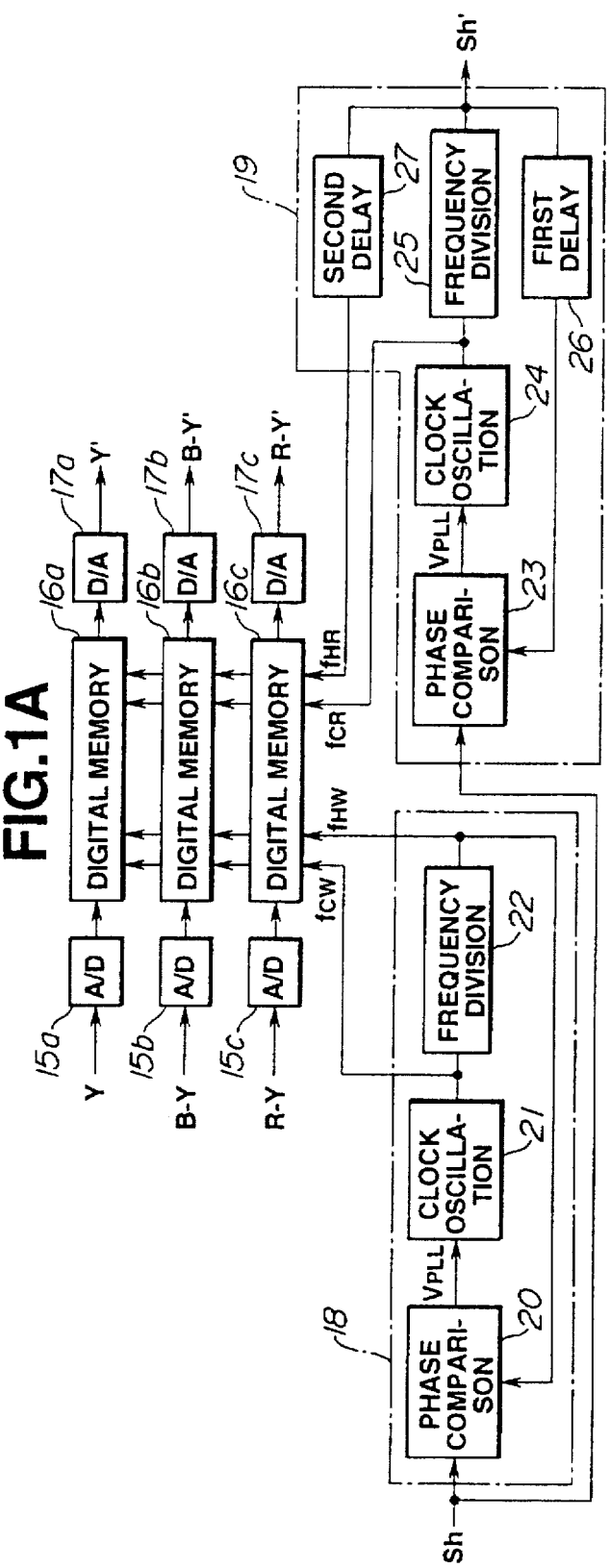
FIG. 1A is a block diagram showing an aspect ratio converting circuit according to one embodiment of the present invention.

The aspect ratio converting circuit 8 is shown more in detail in FIG. 1A. As shown in FIG. 1A, this converting circuit 8 has three digital memories 16a, 16b and 16c each of which is connected between an analog-to-digital converter 15a, 15b or 15c and a digital-to-analog converter 17a, 17b or 17c. The three analog-to-digital converters 15a, 15b and 15c receive the luminance signal Y and the color difference signals B-Y and R-Y, respectively, and converts these analog input signals to corresponding digital signals. These digital signals are supplied, respectively, to the digital memories 16a, 16b and 16c, which provide digital output signals to the digital-to-analog converters 17a, 17b and 17c for returning the signals to the analog form.

The aspect ratio converting circuit 8 further includes a write control circuit 18 for controlling writing operations of the digital memories 16a, 16b and 16c, and a read control circuit 19 for controlling reading operations of the digital memories 16a, 16b and 16c. The write control circuit 18 has a PLL circuit constituted by a phase comparator 20, a clock oscillator 21 and a frequency divider 22. The phase comparator 20 compares the phases of the input horizontal sync signal Sh and a horizontal write timing signal $f_{HW}$ and delivers a control voltage $V_{PLL}$ corresponding to the phase difference to the clock oscillator 21. The clock oscillator 21 generates a clock having a frequency corresponding to this control voltage $V_{PLL}$, and sends the clock to the frequency divider 22. The frequency divider 22 generates a frequency divided clock having a frequency obtained by performing a frequency division of the input frequency to a frequency of horizontal period timing. The frequency divided clock of the frequency divider 22 is fed back to the phase comparator 20. The clock produced by the clock oscillator 21 is supplied, as a write clock $f_{CW}$, to each of the digital memories 16a, 16b and 16c. The frequency divided clock of the frequency divider 22 is supplied, as the horizontal write timing signal $f_{HW}$, to each digital memory.

The read control circuit 19 has a PLL circuit of a phase comparator 23, a clock oscillator 24, a frequency divider 25 and a first delay circuit 26, and a second delay circuit 27. The clock produced by the clock oscillator 24 is supplied, as a read clock $f_{CR}$, to each of the digital memories 16a, 16b and 16c. The frequency divided clock produced by the frequency divider 25 is passed through the second delay circuit 27, and supplied, as a horizontal read timing signal $f_{HR}$, to each digital memory. The frequency divided clock of the frequency divider 25 is fed back through the first delay circuit 26 to the phase comparator 23.

It is possible to change the frequency of oscillation of the clock oscillator 24, as mentioned later, and the frequency divider 25 is arranged to change the frequency division ratio in accordance with the change of the oscillation frequency. Therefore, for a change of the read clock $f_{CR}$, a PLL loop is formed by changing the oscillation frequency of the clock oscillator 24 and the frequency division ratio of the frequency divider 25. When, for example, the oscillation frequency is multiplied by 4/3, the frequency of the horizontal read timing signal $f_{HR}$ can be put in agreement by making the frequency division ratio equal to 3/4.

The first and second delay circuits 26 and 27 are arranged to vary their delays (which are amounts of delay and which can be equal to zero). The phase of the horizontal read timing signal $f_{HR}$ is controlled by the first and second delay circuits 26 and 27. The phase of the horizontal synchronizing signal Sh' is controlled by the first delay circuit 26.

Figure 1B:
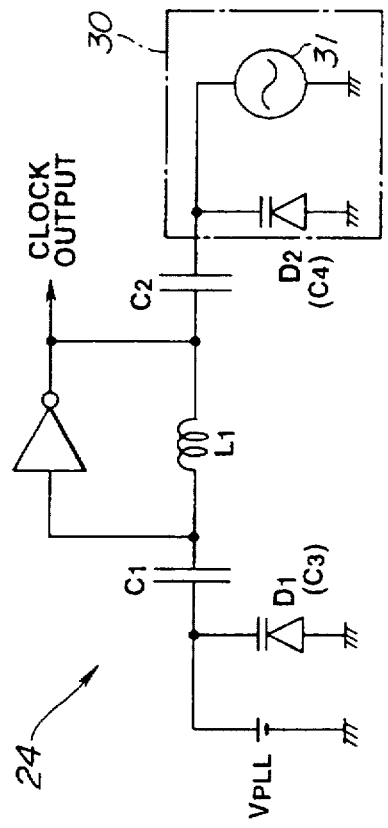
FIG. 1B is a circuit diagram showing a clock oscillator 24 shown in FIG. 1A.
Figure 3:
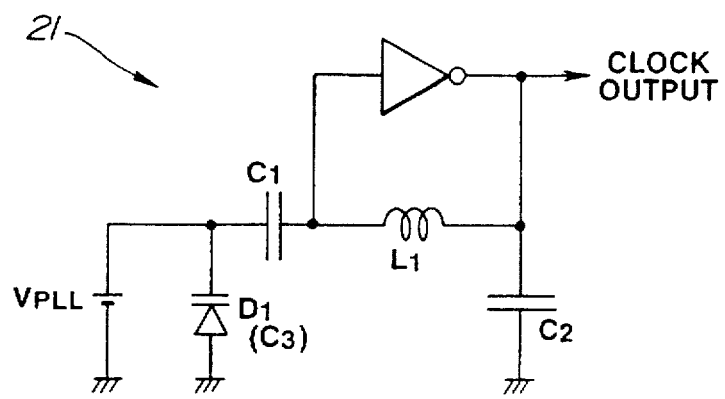
FIG. 3 is a circuit diagram showing a clock oscillator 21 shown in FIG. 1.

FIG. 3 shows the clock oscillator 21 whose oscillation frequency is constant, and FIG. 1B shows the clock oscillator 24 whose oscillation frequency is variable. Each of these clock oscillators 21 and 24 is an oscillator employing an inverter circuit. The clock oscillator 24 shown in FIG. 1B additionally includes a frequency modulating circuit 30.

The oscillation frequency $f_C$ of the clock oscillator 21 shown in FIG. 3 is determined by $L_1$, $C_1$, $C_2$ and a capacitance $C_3$ of a varicap diode $D_1$. By using the total resultant capacitance $C_5$ of the two capacitors $C_1$ and $C_3$ connected in series, the oscillation frequency $f_C$ is given by:

$$fc = \frac{1}{2\pi} \left( \frac{C_2 + C_5}{L \cdot C_2 \cdot C_5} \right)^{1/2} \quad \text{[Eq. 1]}$$

$$\text{where } C_5 = \frac{C_1 \cdot C_3}{C_1 + C_3}$$

Figure 4:
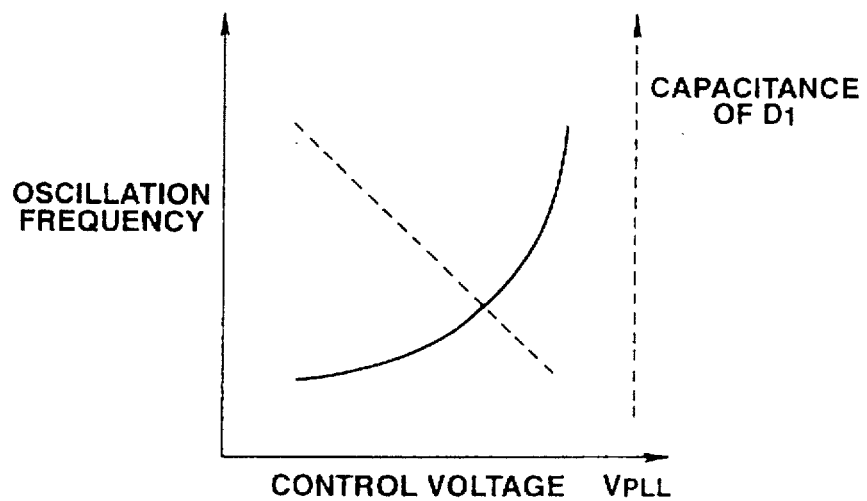
FIG. 4 is a graph showing a characteristic of an oscillation frequency of each of the clock oscillators with respect to a control voltage $V_{PLL}$.

Therefore, the capacitance $C_3$ of the varicap diode $D_1$ is varied in dependence on the voltage between the cathode and anode, and the oscillation frequency is controlled by the control voltage $V_{PLL}$ of the phase comparator 20, as shown in FIG. 4.

The oscillation frequency of the clock oscillator 24 shown in FIG. 1B varies likewise as mentioned above when the capacitance $C_3$ of the first varicap diode $D_1$ varies in accordance with the control voltage $V_{PLL}$ of the phase comparator 23. The oscillation frequency of the clock oscillator 24 is further varied by the capacitance $C_4$ of a second varicap diode $D_2$ of the frequency modulating circuit 30. The capacitance $C_4$ is varied by application to the second varicap diode $D_2$, of a modulation voltage v of a modulation voltage generator 31. The oscillation frequency $f_C$ of the clock oscillator 24 is:

$$fc = \frac{1}{2\pi} \left( \frac{C_5 + C_6}{L \cdot C_5 \cdot C_6} \right)^{1/2} \quad \text{[Eq. 2]}$$

$$\text{where } C_5 = \frac{C_1 \cdot C_3}{C_1 + C_3}, C_6 = \frac{C_2 \cdot C_4}{C_2 + C_4}$$

The modulation voltage generator 31 produces a constant voltage (at a center of a parabolic wave shown in FIG. 6) in the modes other than the wide mode. In the wide mode, the voltage generator 31 delivers the modulation voltage v in the form of a parabolic wave as shown in FIG. 6.

Figure 5:
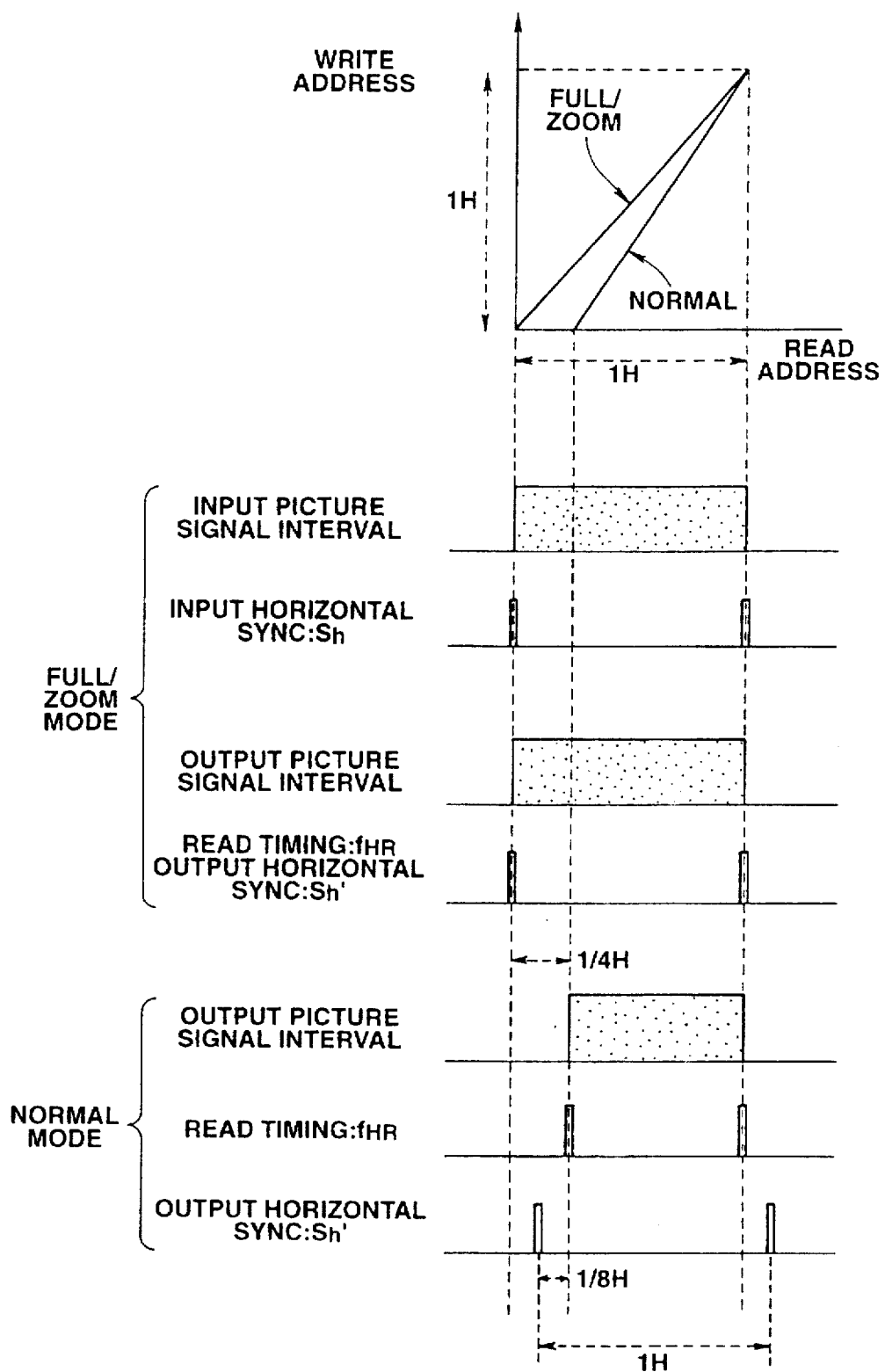
FIG. 5 is a schematic view illustrating timing of writing and reading, and timing of various signals in full, zoom and normal modes in the system according to one embodiment of the present invention.
Figure 6:
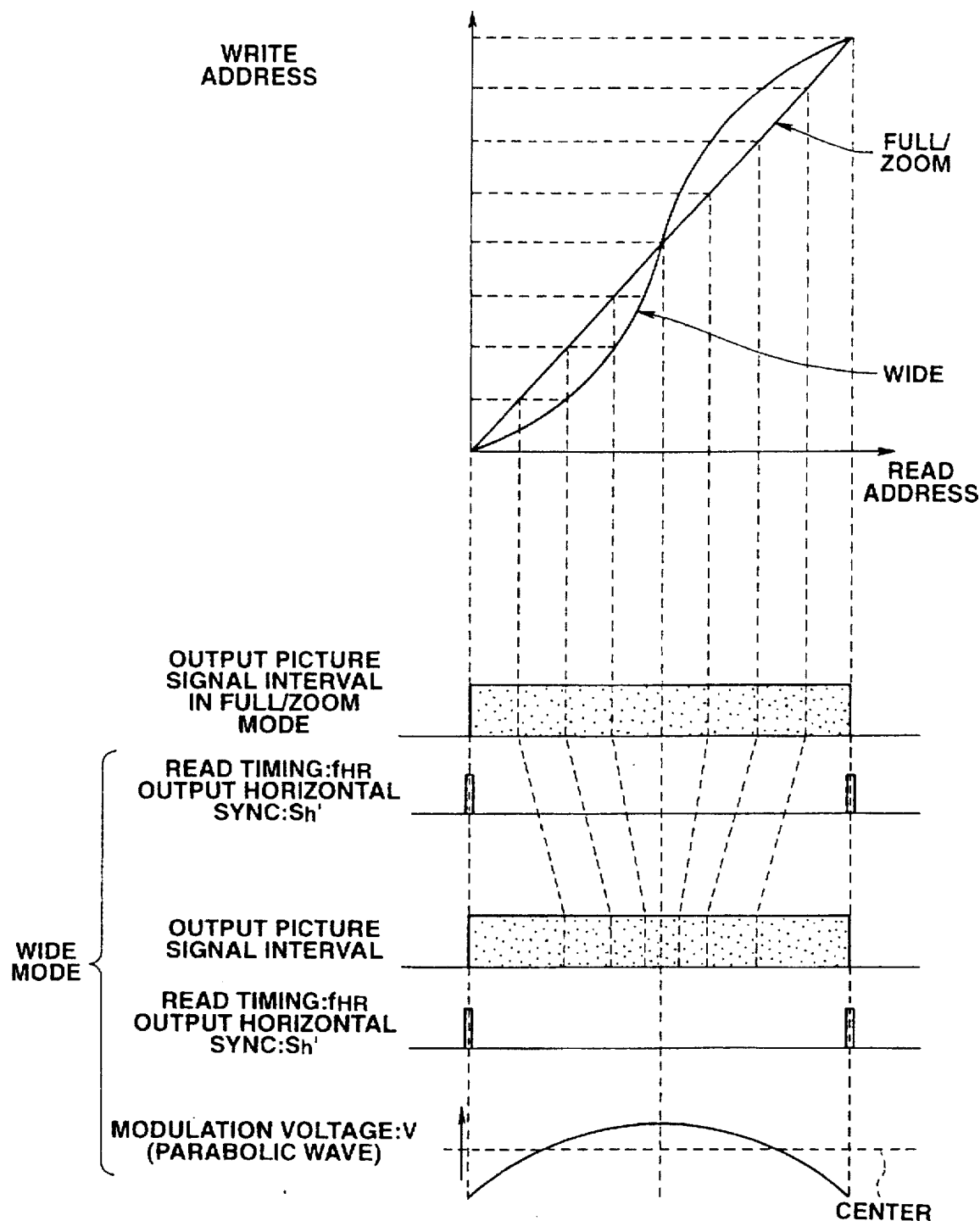
FIG. 6 is a schematic view similar to FIG. 5, but illustrating the timing in a wide mode.

The thus-constructed system is operated as shown in FIGS. 5 and 6. In a graph in each of FIGS. 5 and 6, write address and read address of each of the digital memories 16a, 16b and 16c are shown. The vertical axis of each graph shows the position of writing of picture data in one horizontal interval, and the horizontal axis shows the position of reading of the picture data.

Figure 7A:
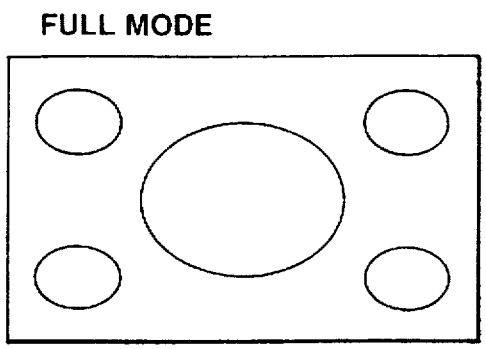
FIGS. 7A, 7B, 7C and 7D are views showing pictures displayed on a screen in the full, normal, zoom and wide display modes, respectively.
Figure 7B:
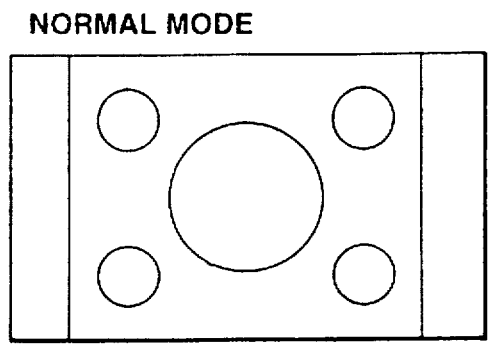
Figure 7C:
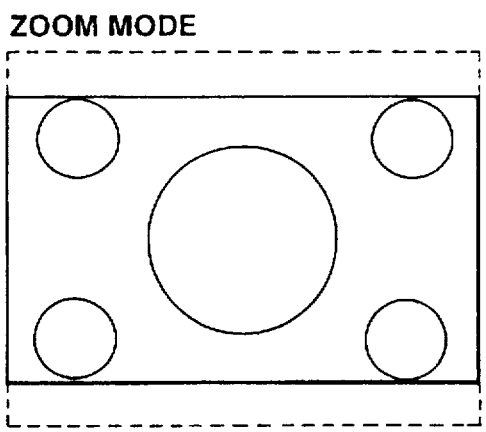

When the full mode shown in FIG. 7A or the zoom mode shown in FIG. 7C is selected, the oscillation frequency of the clock oscillator 24 and the frequency division ratio of the frequency divider 25 are set, respectively, at standard values, and the delays of the first and second delay circuits 26 and 27 are both set equal to zero. Therefore, in each digital memory 16a, 16b or 16c, the speeds of reading and writing are equal to each other, so that the signal is outputted with neither compression nor expansion along the horizontal direction. The read timing signal $f_{HR}$ and the output horizontal synchronizing signal Sh' are produced at the same timing as the input horizontal synchronizing signal Sh, so that there is no delay.

When the normal mode shown in FIG. 7B is selected, the oscillation frequency of the clock oscillator 24 is multiplied by 4/3, and the frequency division ratio of the frequency divider 25 is 3/4. The first delay circuit 26 is so set that the output horizontal synchronizing signal Sh' is delayed by one eighth (⅛H) of the horizontal interval with respect to the input horizontal synchronizing signal Sh. The delay amount of the second delay circuit 27 is set equal to one eighth of the horizontal interval. Therefore, as shown in FIG. 5, the reading speed in each digital memory 16a, 16b or 16c is 4/3 times as high as the writing speed, and as a result, the video signal is compressed in the horizontal direction to 3/4. The read timing is delayed by one fourth (¼H) of the horizontal interval, and the timing of horizontal deflection is delayed by one eighth of the horizontal interval. Therefore, the picture section is centered in the screen.

Figure 7D:
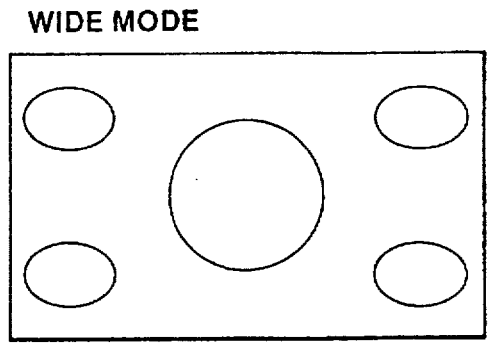
Figure 8:
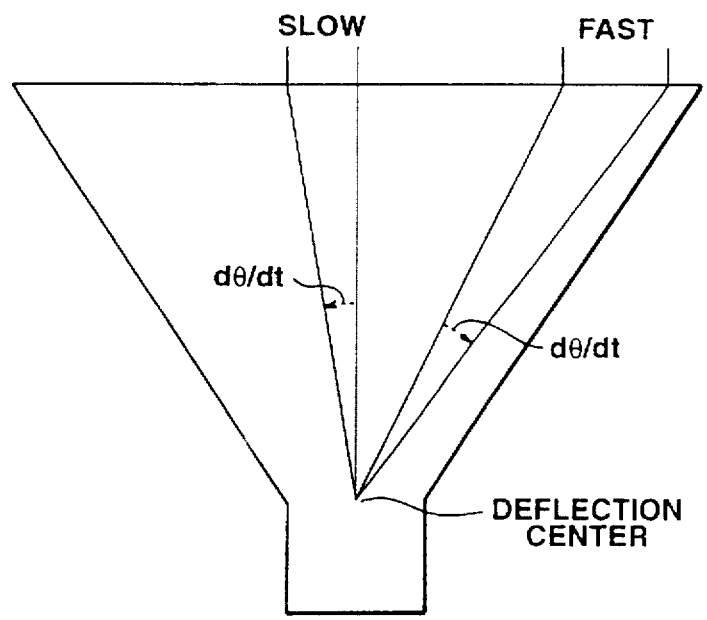
FIG. 8 is a view for illustrating a relationship between an angular speed and a scanning speed in a conventional display device.
Figure 9:
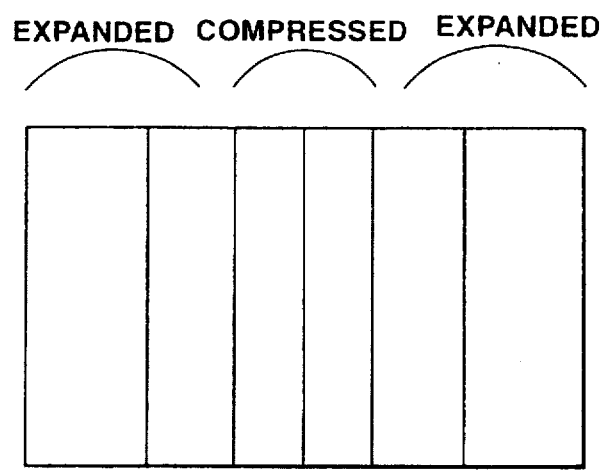
FIG. 9 is a view for illustrating a picture displayed in the conventional display device when the angular speed is constant.

When the wide mode shown in FIG. 7D is selected, the oscillation frequency of the clock oscillator 24 and the frequency division ratio of the frequency divider 25 are set, respectively, at the standard values as in the full and zoom modes. However, the voltage generator 31 produces the modulation voltage v of the parabolic wave. The delays of the first and second delay circuits 26 and 27 are set equal to zero. Therefore, the PLL loop of the read control circuit 19 converges with the center of ALP of the parabolic wave as an oscillation frequency at no modulation, and the frequency is modulated so as to increase the frequency in the upper side in the parabolic wave, and to decrease the frequency in the lower side of the parabolic wave. Accordingly, the timings of writing and reading do not correspond in a one-to-one manner, and the reading along the horizontal direction is coarse in the left and right sides, and fine in the central portion. Thus, this system can provide a wide mode picture with the left and right sides being expanded, and the central region being compressed.

In the illustrated example according to the present invention, the horizontal deflection system has the S correction, and the aspect ratio converting circuit 8 acts in effect to cancel the S correction to achieve the wide display mode. There is no need for providing a switching device for adding and removing the S correction. The aspect ratio converting circuit 8 is used as the horizontal nonlinear processing circuit, so that it suffices to add the frequency modulating circuit 30. Furthermore, by causing the modulation voltage generating circuit 31 to generate the modulation voltage in the form of an inverted parabolic wave, this system can perform the S correction without the means for the S correction in the horizontal deflection system. Therefore, it is possible to turn the S correction on and off only with the aspect ratio converting circuit and to eliminate the S correcting means from the horizontal deflecting system.

In the illustrate example, the present invention is applied to a television receiver. However, the present invention is further applicable to various other systems for presenting visual images, such as VCR, TV tuner, AV switch, and VTR. Specifically, the present invention is applicable to equipment items connected with a television receiver having a wide screen. The waveform of the modulation voltage is not limited to the parabolic waveform. By using a rectangular wave, a triangular wave or a trapezoidal wave, it is possible to achieve the wide mode in which the left and right side regions are expanded and the central region is compressed in different proportions. It is further possible to control the horizontal expansion and compression freely by using various other waveforms to achieve one or more special display modes. In the illustrated example, the source picture aspect ratio is 4:3 and the screen aspect ratio is 16:9. However, the present invention is applicable to various other cases involving different aspect ratios.

In the illustrated example, the read control circuit 19 is arranged to modulate the frequency of the sampling clock. However, it is optional to arrange the write control circuit 18 to modulate the frequency of the sampling clock, or to arrange both of the write and read control circuits 18 and 19 to modulate the sampling clock frequencies.

What is claimed is:

1. A picture signal processing circuit for use with a display having a first aspect ratio and a horizontal deflecting circuit including S-correction means, comprising:
   a synchronizing separator circuit for separating a synchronizing signal from an input picture signal of a second aspect ratio;
   analog to digital converting means for converting the input picture signal of the second aspect ratio into a digital signal;
   a digital memory for storing said digital signal of the second aspect ratio;
   write control circuit means receiving the separated synchronizing signal and including first clock oscillator means for producing a write clock signal at a first constant frequency for writing the digital signal into said digital memory at intervals of horizontal scanning;
   selection means for receiving a selection corresponding to one of a first state, a second state, and a third state;
   read control circuit means receiving the separated synchronizing signal and the selection from the selection means and including second clock oscillator means, delay circuit means for delaying a read time of the digital signal written into said digital memory, and a frequency modulating circuit for selectively modulating a frequency of a read clock signal and producing a variable frequency signal for reading the digital signal from said digital memory at intervals of horizontal scanning; and
   digital to analog converting means for converting said digital signal of said second aspect ratio read out from said digital memory into a picture signal for display on the display having the first aspect ratio;
   wherein when said selection corresponds to said first state the read control circuit means reads out the stored digital signal from said digital memory at a second constant frequency and the delay time of the read operation determined by the delay circuit means is substantially zero, such that the S-correction operation Performed by the S-correction means is not canceled;
   wherein when said selection corresponds to said second state the read control circuit means reads out the stored digital signal from said digital memory at a third constant frequency and starts the read operation at a delay time determined by the delay circuit means so as to cause the digital signal written into said digital memory to be displayed at a center portion of the display, such that the S-correction operation performed by the S-correction means is not canceled;
   wherein when said selection corresponds to said third state the read control circuit means reads out the digital signal written into said digital memory at the modulated frequency and the delay time of the read operation determined by the delay circuit means is substantially zero, such that the S-correction operation performed by the S-correction means is canceled; and
   wherein said first constant frequency of said write clock signal is independent of a time of receipt of said selection by said selection means.

2. A picture signal processing circuit according to claim 1 wherein said frequency modulating circuit generates a parabolic wave synchronous with a horizontal synchronizing signal of said input picture signal when said selection corresponds to said third state.

3. A picture signal processing circuit according to claim 2 wherein the horizontal deflecting circuit performs deflection in accordance with the horizontal scanning period varied by said second clock oscillator means.

4. A picture signal processing circuit according to claim 3 wherein said second clock oscillator means oscillates so as to compress both side regions in the display of said input picture signal along a horizontal scanning direction as compared with a central region of the display when the selection corresponds to the second state.

5. A picture signal display system comprising:
   a display having a first aspect ratio and a horizontal deflection circuit for displaying a picture signal;
   a synchronizing separator circuit for separating a synchronizing signal from an input picture signal of a second aspect ratio;

analog to digital converting means for converting the input picture signal of the second aspect ratio into a digital signal;

a digital memory for storing said digital signal of the second aspect ratio;

write control circuit means receiving the separated synchronizing signal and including first clock oscillator means for producing a write clock signal at a first constant frequency for writing the digital signal into said digital memory at intervals of horizontal scanning;

selection means for receiving a selection corresponding to one of a first state, a second state, and a third state;

read control circuit means receiving the separated synchronizing signal and the selection from the selection means and including delay circuit means for delaying a read time of the digital signal written into said digital memory and second clock oscillator means for selectively modulating a frequency of a read clock signal and producing a variable frequency signal for reading the digital signal from said digital memory at intervals of horizontal scanning; and digital to analog converting means for converting said digital signal of said second aspect ratio read out from said digital memory into a picture signal for display on said display having said first aspect ratio;

wherein when said selection corresponds to said first state the read control circuit means reads out the stored digital signal from said digital memory at a second constant frequency and the delay time-of the read operation determined by the delay circuit means is substantially zero, such that the S-correction operation performed by the S-correction means is not canceled;

wherein when said selection corresponds to said second state the read control circuit means reads out the stored digital signal from said digital memory at a third constant frequency and starts the read operation at a delay time determined by the delay circuit means so as to cause the digital signal written into said digital memory to be displayed at a center portion of the display, such that the S-correction operation performed by the S-correction means is not canceled;

wherein when said selection corresponds to said third state the read control circuit means reads out the digital signal written into said digital memory at the modulated frequency and the delay time of the read operation determined by the delay circuit means is substantially zero, such that the S-correction operation performed by the S-correction means is canceled; and wherein said first constant frequency of said write clock signal is independent of a time of receipt of said selection by said selection means.

6. A picture signal display system according to claim 5 wherein said frequency modulating circuit generates a parabolic wave synchronous with a horizontal synchronizing signal of a input picture signal when said selection corresponds to said third state.

7. A picture signal display system according to claim 6 wherein the horizontal deflecting circuit performs deflection in accordance with the horizontal scanning period varied by said second clock oscillator means.

8. A picture signal display system according to claim 7 wherein said second clock oscillator means oscillates so as to compress both side regions in the display of said input picture signal along a horizontal scanning direction as compared with a central region of the display when the selection corresponds to the second state.

9. A picture signal display system according to claim 7 wherein said second clock oscillator means corrects said picture signal by said S-correction operation in response to said parabolic wave when said selection corresponds to said third state.

* * * * *